(12) United States Patent
Sytnik et al.

(10) Patent No.: US 11,089,234 B2
(45) Date of Patent: Aug. 10, 2021

(54) SYSTEMS AND METHODS OF IMAGE ENHANCEMENT

(71) Applicant: Shinyfields Limited, Nicosia (CY)

(72) Inventors: Dmitry Sytnik, Kiev (UA); Andrey Frolov, Petropavlovskaya Borshchagovka (UA)

(73) Assignee: SHINYFIELDS LIMITED

( * ) Notice: Subject to any disclaimer, the term of this patent is extended or adjusted under 35 U.S.C. 154(b) by 0 days.

(21) Appl. No.: 16/149,812

(22) Filed: Oct. 2, 2018

(65) Prior Publication Data

US 2020/0106944 A1 Apr. 2, 2020

(51) Int. Cl.
*H04N 5/235* (2006.01)
*G06T 5/20* (2006.01)

(52) U.S. Cl.
CPC ............ *H04N 5/2356* (2013.01); *G06T 5/20* (2013.01); *H04N 5/2351* (2013.01); *H04N 5/2355* (2013.01)

(58) Field of Classification Search
CPC .. H04N 5/2356; H04N 5/2351; H04N 5/2355; G06T 5/20
See application file for complete search history.

(56) References Cited

U.S. PATENT DOCUMENTS 8,988,548 B2 * 3/2015 Manabe ............... H04N 5/2355
348/222.1

* cited by examiner

*Primary Examiner* — Twyler L Haskins
*Assistant Examiner* — Angel L Garces-Rivera
(74) *Attorney, Agent, or Firm* — McCarter & English, LLP

(57) ABSTRACT

Example embodiments are directed to a system of image enhancement. An interface device is configured to receive as input one or more input images. The one or more input images have one or more exposure values. A processing device is configured to execute an exposure value (EV) resampling module to generate one or more resampled images having exposure values different from the one or more exposure values of the one or more input images. The resampled images have a range of exposure values. The processing device is configured to execute a filtering module to filter the resampled images, and output a set of filtered images. The processing device is configured to execute a blending module to sequentially blend the set of filtered images, and output a merged image.

22 Claims, 24 Drawing Sheets

SYSTEMS AND METHODS OF IMAGE ENHANCEMENT

TECHNICAL FIELD

The present disclosure relates to systems and methods of image enhancement using bracketed exposure merging to generate a realistic image substantially free of visual artifacts from a set of images.

BACKGROUND

Modern digital cameras are generally unable to cover a broad dynamic range of scene luminance during the image capture process, which can be particularly critical for landscape and indoor photography. In high contrast scenes, the sensors of traditional digital cameras cannot properly record all of the information from the brightest and darkest areas in the field-of-view. As a result, the digital photograph generated often has limited information in the brightest and darkest areas. Such bright and dark areas of a photograph present correction challenges to existing approaches of manual luminance (brightness) adjustment of shadows and highlights on the image.

The bright and dark areas of a photograph occur because modern cameras have a narrower dynamic range than the human eye. For example, with the human eye, we can often see both an interior of a room and what is behind a window at the same time. In contrast, a camera can capture the interior of the room while leaving objects behind the window overexposed with limited, if any, possibility of restoration, or capture objects behind the window while leaving the interior objects completely dark.

Traditionally, an exposure bracketing approach has been applied to the image to obtain a high-quality image of the example scene discussed above. A photographer can use a tripod to capture several images of the same scene with different luminance (brightness) values. Different exposure merge methodology of combination of these images can be used to generate a resulting merged image where the luminance of all images is captured and represented. However, traditional methodology is not known to not output a universal outcome suitable for different types of scenes and generally necessitate additional manual adjustments to obtain a realistic resulting image.

A need exists for improved image enhancement systems and methods to generate a realistic image substantially free of visual artifacts from a set of images for different types of scenes and without manual adjustments.

SUMMARY

In accordance with embodiments of the present disclosure, an example system of image enhancement is provided. The system includes an interface device configured to receive as input one or more input images. The one or more input images have one or more exposure values. The system includes a processing device in communication with a user interface, e.g., of the interface device. The processing device is configured to execute an exposure value (EV) resampling module to receive as input the one or more input images, and generate one or more resampled images having exposure values different from the one or more exposure values of the one or more input images. The one or more resampled images and the one or more input images form a set of resampled images having a range of exposure values. The processing device is configured to execute a filtering module to receive as input the set of resampled images, filter the set of resampled images, and output a set of filtered images. The processing device is configured to execute a blending module to receive as input the set of filtered images, sequentially blend the set of filtered images, and output a merged image.

In some embodiments, the one or more input images include a single input image having a single exposure value. In such embodiments, the exposure values of the one or more resampled images are incrementally greater and smaller in exposure value than the single exposure value of the single input image. In some embodiments, the one or more input images include two or more input images having different input exposure values. In such embodiments, the exposure values of the one or more resampled images are incrementally different from the input exposure values to complete the range of exposure values.

The processing device is configured to execute a sorting module to receive as input the one or more input images and arrange the one or more input images from highest exposure value to lowest exposure value. The one or more resampled images generated by the EV resampling module incrementally fill exposure value "gaps" between the one or more input images to complete the range of exposure values. The set of resampled images include equal exposure value increments within the range of exposure values. In some embodiments, the range of exposure values can be, e.g., from −3.0 to +3.0, from −20 to +2.0, or the like. In some embodiments, the equal exposure value increments can be, e.g., 0.5, 1.0, 1.5, or the like. In some embodiments, the processing device is configured to execute a luminosity mask module to receive as input the one or more input images and generate a monochrome masked set of images corresponding with the one or more input images.

The filtering module generates a monochrome luminance representation of each of the images of the set of resampled images, and filters the monochrome luminance representation of the set of resampled images. The filtering module can apply a modified local Laplacian filter to filter the set of resampled images. The blending module defines an image of the set of filtered images having a highest exposure value as a base image for blending, and blends the base image with an adjacent image having an incrementally lower exposure value (e.g., the next highest exposure value). The merged image includes luminance information of each of the set of resampled images.

The processing device is configured to execute a normalization module to receive as input the merged image, perform contrast normalization on the merged image, and output a normalized image. In some embodiments, the normalized image output by the normalization module is defined as the enhanced image. In some embodiments, the processing device is configured to execute a post-processing module to receive as input the normalized image, perform at least one of white balance correction, sharpness correction, and detail correction on the normalized image, and output an enhanced image.

In accordance with embodiments of the present disclosure, an example method of image enhancement is provided. The method includes receiving as input at an interface device one or more input images. The one or more input images have one or more exposure values. The method includes executing an EV resampling module with a processing device to receive as input the one or more input images, and generate one or more resampled images having exposure values different from the one or more exposure values of the one or more input images. The one or more resampled images and the one or more input images form a set of resampled images having a range of exposure values. The method includes executing a filtering module with the processing device to receive as input the set of resampled images, filter the set of resampled images, and output a set of filtered images. The method includes executing a blending module with the processing device to receive as input the set of filtered images, sequentially blend the set of filtered images, and output a merged image.

The method includes executing a sorting module with the processing device to receive as input the one or more input images and arrange the one or more input images from highest exposure value to lowest exposure value. The method includes executing a normalization module with the processing device to receive as input the merged image, perform contrast normalization on the merged image, and output a normalized image. In some embodiments, the method includes executing a post-processing module with the processing device to receive as input the normalized image, perform at least one of white balance correction, sharpness correction, and detail correction on the normalized image, and output an enhanced image.

In accordance with embodiments of the present disclosure, an example non-transitory computer-readable medium storing instructions at least for enhancing images that are executable by a processing device is provided. Execution of the instructions by the processing device causes the processing device to receive as input at an interface device one or more input images. The one or more input images have one or more exposure values. Execution of the instructions by the processing device causes the processing device to execute an EV resampling module to receive as input the one or more input images, and generate one or more resampled images having exposure values different from the one or more exposure values of the one or more input images. The one or more resampled images and the one or more input images forming a set of resampled images having a range of exposure values. Execution of the instructions by the processing device causes the processing device to execute a filtering module to receive as input the set of resampled images, filter the set of resampled images, and output a set of filtered images. Execution of the instructions by the processing device causes the processing device to execute a blending module to receive as input the set of filtered images, sequentially blend the set of filtered images, and output a merged image.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed systems and methods of image enhancement, reference is made to the accompanying figures, wherein.

DESCRIPTION OF EXAMPLE EMBODIMENTS

Figure 1:
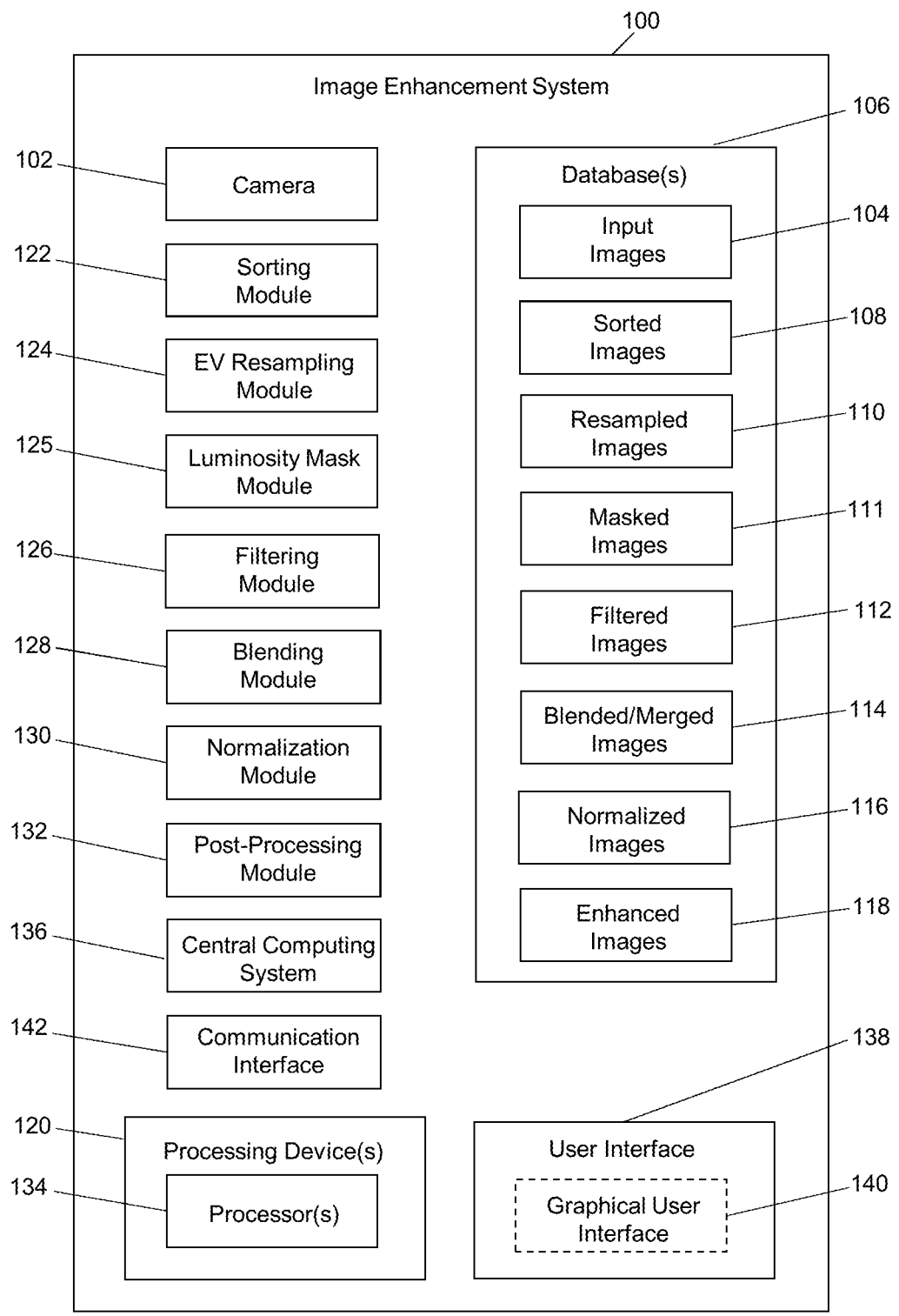
FIG. 1 is a block diagram of an example system of image enhancement in accordance with the present disclosure.

In accordance with embodiments of the present disclosure, example systems of image enhancement are provided that receive one or more images and perform bracketed exposure merging to generate a realistic image substantially free of visual artifacts. The example systems include a frame EV resampling module configured to resample the input images to generate additional images incrementally varied by exposure value to ensure that a uniform incremental range of exposure values is used in the bracketed exposure merging step. It should be understood that the example systems can receive as input and enhance one or more images, and the one or more images can be in color or monochrome. Although the exemplary images discussed herein include landscape photographs, it should be understood that the disclosed systems can be implemented for any time of digital images to enhance, improve and/or dehaze images (e.g., medical imagery enhancement, or the like). The exemplary system receives as input one or more images and is capable of stretching and/or extending the dynamic range of the input image, resulting in the output enhanced image.

As used herein, a bracket refers to a set of multiple images captured with different exposure values (different EVs). In some embodiments, the number of images can be two images or more (e.g., an infinite number of images greater than two).

As used herein, a merged result refers to an image received or generated by merging images from the bracket into a single image in which the luminance (brightness) information from all bracket images is available. The merged result image includes all of the information of a broad dynamic range. A camera is generally not able to record the full dynamic range of a scene into a single image. The example system merges several images with different EVs to cover the full dynamic range.

As used herein, exposure value (EV) refers to a shift of exposure as compared to the standard scene exposition. The exposure value can be both positive and/or negative. Images having positive and/or negative exposure values as compared to the standard scene exposition results in images that are lighter or darker than a regular image of the scene. Implementing a range of exposure values for an image or scene obtains the details of the scene in the overexposed or underexposed areas, resulting in an enhanced image.

The example systems perform a universal realistic high quality automatic bracketed exposures merge technology algorithm that produces a realistic image substantially free of visual artifacts from a set of images taken with different expositions (with different exposure values covering a broad dynamic range of the scene otherwise impossible to obtain by one image). In some embodiments, the process executed by the system works universally irrespective of the intensity of luminance to overcome flaws of traditional high dynamic range image merge technologies (e.g., tone mapping, or the like).

A set of images captured with different exposure values is taken as input and the images cover a whole or substantially whole broad dynamic range. Based on the input images, the system generates a realistic detailed image where broad dynamic range is restored. The image generated by the example system is therefore substantially free of visual artifacts, such as lack or excess of contrast, lack or excess of details, halos, insufficient restoration of highlights, dark and light spots, incorrect distribution of luminance, unrealistic details, oversaturation or undersaturation, combinations thereof, or the like. Such visual artifacts can generally be attributed to traditional high dynamic range merge methods that modify or deteriorate a processed image, resulting in an unrealistic image.

In some embodiments, the system can be implemented with a set of two or more images as input to generate a single enhanced image. The systems discussed herein therefore generate a new, enhanced image from a set of images captured or taken with different exposure values, and improve the dynamic range to obtain a resulting image that significantly surpasses traditional approaches to high dynamic range image merge. The process performed by the example system can also be executed more efficiently than traditional high dynamic range image merge approaches.

In some embodiments, the system can be implemented with a single image as input to significantly enhance and improve the single image (e.g., a single image dynamic range enhancement). As discussed herein, the system can materially enhance the quality of the single image and the dynamic range of luminance (brightness) of the image in a realistic manner. The system substantially improves the single input image by means of intellectual luminance (brightness) adjustment. The process results in a minimization of, and/or lack of, artifacts and/or halos, and allows for automatic adjustment of the luminance (brightness) balance of shadows and highlights, removal of haze (e.g., dehaze), adjustment of colors and/or details, correction of problems with exposition of the single image (underexposed or overexposed), enhancement of the image sharpness and/or details, avoidance of lack of details, combinations thereof, or the like.

FIG. 1 is a block diagram of an example image enhancement system 100 (hereinafter "system 100") is provided. The system 100 includes a camera 102 capable of capturing one or more digital images that are received as input images 104 by the system 100. The system 100 includes one or more databases 106 configured to receive and electronically store data corresponding to operation of the system 100 and data corresponding to images received, edited and/or enhanced by the system 100 (e.g., input images 104, sorted images 108, resampled images 110, masked images 111, filtered images 112, blended images 114, normalized images 116, enhanced images 118, combinations thereof, or the like).

The system 100 includes units or modules configured to be executed by a processing device 120 to enhance the input images 104. In some embodiments, the system 100 can include, e.g., a sorting module 122, an EV resampling module 124, a luminosity mask module 125, a filtering module 126, a blending module 128, a normalization module 130, a post-processing module 132, combinations thereof, or the like. The operation of each module 122-132 will be discussed in greater detail below. Although shown as individual modules, it should be understood that one or more of the modules 122-132 can be combined into a single module, and/or any of the modules can be distributed.

The processing device 120 can include one or more processors 134 for executing the modules 122-132. The system 100 can include a central computing system 136 for controlling the steps performed by the system 100. In some embodiments, the central computing system 136 can include the one or more processing devices 120. The system 100 can include an interface device 138, such as a user interface having a graphical user interface (GUI) 140. The GUI 140 can be used to input data and/or instructions into the system 100, and to output data and/or images to the user. The system 100 can include a communication interface 142 configured to provide communication and/or transmission of data between the interface device 138, e.g., user interface, the central computing system 136, the processing device 120, the database 106, the camera 102, and the modules 122-132.

In some embodiments, the system 100 can be implemented to perform bracket exposure merging on a set of two or more images captured with different exposure values. The system 100 can execute one or more of the modules 122-132 to combine and merge bracket images by using a special mask. The mask can initially be created based on image luminance (brightness), and then filtered by a modified local Laplacian filter. In some embodiments, the modified local Laplacian filter can be built by using a Laplacian Pyramid. (See Aubry, M. et al., "Fast Local Laplacian Filters: Theory and Applications", ACM Transactions on Graphics, Vol. 33, Issue 5, Article No. 167, August 2014). The modified local Laplacian filter can be used to enhance an image substantially free of halo or reverse gradients as is the case when blurring by a traditional Gauss filter, bilateral filter, or guided filter.

The system 100 receives as input the bracket, including two or more images captured by the camera 102 with different exposure values. Such input is electronically transmitted to and stored as input images 104 in the database 106. As an example, the input images 104 can include four digital images, one image with an exposure value of −4.0, one image with an exposure value of −2.0, one image with an exposure value of 0.0, and one image with an exposure value of +2.0. The processing device 120 executes the sorting module 122 to arrange, order or sort the input images 104 by a reduction in the exposure value (e.g., +2.0, 0.0, −2.0, −4.0). In some embodiments, the input images 104 can be arranged by an increase in the exposure value. The rearranged images can be electronically stored as stored images 108 in the database 106.

After the images have been sorted, the processing device 120 can execute the EV resampling module 124 to generate as output a set or sequence of images (the resampled images 110) having a unified or uniform difference in exposure value. The images 110 generated by the EV resampling module 124 compensate for a sequential, uniform difference in exposure value of the sorted images 108, outputting a set of images having an sequential and incremental exposure value. For example, for the input images 104 having exposure values of +2.0, 0.0, −2.0, −4.0, the EV resampling module 124 can generate additional images at a step of 0.5 EV to output resampled images 110 having a range of exposure values from +4.0 to −4.0.

The EV resampling module 124 can generate images an exposure value range sufficiently small and even, whether in the bright or dark side, from the conditional starting point of 0.0 exposure value. An insufficient range or exposure changes that are not small or even enough can result in improperly rendered lights or apparent problems with contrast (e.g., the exposure value range of the input images 104). Execution of the EV resampling module 124 outputs resampled images 110 having the sufficiently small and even exposure value range for performing the bracketed exposure merge.

The resampling process performed by the EV resampling module 124 involves receiving as input the sorted images 108 having various exposure values in a sequence (e.g. −2.0, 0.0, +1.0). The resampled images 110 output by the EV resampling module 124 should be arranged by exposure value increments of the same size. The desired exposure value increment or step can be defined adaptively based on the quality or detail of the input images 104, or can be set beforehand (e.g., an exposure value increment of 0.5, 1.0, 1.5 or the like). The luminance (brightness) of additional virtual images generated by the EV resampling module 124 can be calculated automatically by increasing or decreasing of the exposure value of the adjacent images based on the predetermined exposure value increment.

Thus, new images with a fixed exposure value are generated by the EV resampling module 124. In some embodiments, the new images generated by the EV resampling module 124 can be used to complete the missing incremental images of the sorted images 108, resulting in a complete incremental set of images having a range of exposure values made up of the input images 104 and the resampled images 110. In some embodiments, only the new images generated by the EV resampling module 124 can be used in the subsequent enhancement steps described herein, with the input images 104 serving as the base images from which the resampled images 110 are generated.

As an example, if the input images 104 have exposure values of −2.0, 0.0, +1.0, the EV resampling module 124 can resample the input images 104 with an increment or step of 0.5 to output the resampled images 110 having exposure values of −2.5, −2.0, −1.5, −1.0, −0.5, 0.0, +0.5, +1.0, +1.5. Thus, the new images generated by the EV resampling module 124 complete the incremental set of images have exposure values of −2.5, −1.5, −1.0, −0.5, +0.5, and +1.5. In such embodiments, the resampled images 110 include the combination of the input images 104 and the new images generated by the EV resampling module 124, with each of the images being processed and enhanced during the subsequent steps of the system 100.

As a further example, if the input images 104 have exposure values of −2.1, −0.9, +0.9 and +2.1, the EV resampling module 124 can resample the input images 104 with an increment or step of 1.5 to output the resampled images 110 having exposure values of −3.0, −1.5, 0.0, +1.5 and +3.0 (e.g., exposure values having equal incremental steps). In such embodiments, the input images 104 can be used only as the base images for generation of the resampled images 110, with only the resampled images 110 having the equal incremental exposure values being used in the subsequent enhancement steps of the system 100.

In some embodiments, example Equation 1 below can be used by the EV resampling module to perform the image luminance (brightness) calculation:

$$\text{Current Image EV} = \text{From EV} + \text{Current Image Index} * \text{Step EV} \quad (1)$$

where Current Image EV represents the brightness of the current image to be calculated, From EV represents the exposure value of the darkest image, Current Image Index represents a sequence number of the current image, and Step EV represents an increment or step of the exposure value change in the sequence. The exposure value can be calculated for each digital image to be created using example Equation 1. The digital image generated by the EV resampling module 124 therefore applies an exposure to the nearest image by the designated "+" or "−" increment until the desired range of exposure value images is obtained.

The range of the exposure values is therefore determined first from the lowest exposure value to the highest exposure value, depending on the exposure value step and/or the file format used. The exposure value can be calculated by the EV resampling module 124 for each virtual image to be generated using example Equation 1. The nearest input image (e.g., "real" image) exposure value adjacent to the exposure value of the new virtual image is determined by the EV resampling module 124, and the virtual image is generated by the EV resampling module 124 based on the difference between the exposure value of the virtual image and the exposure value of the nearest input image. The nearest image is modified by the exposure to the defined virtual image. As a result, the new virtual image is generated by the EV resampling module 124. The process can be sequentially repeated by the EV resampling module 124 until the entire exposure value range is generated.

The size of the increments or steps for generation of the new exposure value images can vary depending on the different types of files received as input, e.g., RAW, TIFF, JPG. In some embodiments, RAW data can include a wider dynamic exposure value range than TIFF or JPG data. The new images generated by the EV resampling module 124 can cover an entire luminance (brightness) range with a fixed size of increments or steps. The newly generated images go beyond the captured exposure value range (the range of the input images 104) and results in images that are slightly darker than the darkest captured input image and slightly brighter that the brightest captured input image.

In some embodiments, the EV resampling module 124 can generate a range of images having equal positive and negative exposure value endpoints (e.g., −4.5 to +4.5). In some embodiments, the EV resampling module 124 can generate a range of images having unequal positive and negative exposure value endpoints (e.g., −3.5 to +2.5). The number of resampled images and the exposure value range of images generated by the EV resampling module 124 can vary based on, e.g., the dynamic range of the camera, the characteristics of the image being enhanced, combinations thereof, or the like.

After the desired images have been generated by the EV resampling module 124, the luminosity mask module 125 can be executed by the processing device 120 to receive as input each of the resampled images 110 and generate a monochrome luminance representation (e.g., a map or mask) of each image 110. The masked images 111 generated by the luminosity mask module 125 therefore define luminosity representations of the EV resampled images. In some embodiments, the brightest image of the resampled images 110 can be used as a base image to generate the masked images 111. Thus, the number of masked images 111 generated by the luminosity mask module 125 can be one image less than the number of resampled images 110, with the brightest resampled image 110 remaining unchanged. The masked images 111 generated by the luminosity mask module 125 can indicate areas of the images 111 where loss of exposure values has occurred during the resampling process (e.g., areas that may necessitate the addition of details during subsequent processing steps described herein). In some embodiments, the luminosity mask module 125 can be integrated into the filtering module 126.

The filtering module 126 can be executed by the processing device 120 to receive as input the masked images 111. Each of the masked images 111 can be filtered by a modified local Laplacian filter or algorithm during execution of the filtering module 126. Thus, the luminance mask for each resampled image 110 can be filtered by the modified local Laplacian filtering.

Execution of the filtering module 126 involves removal of the details by mask filtering using the modified local Laplacian filter. In some embodiments, the filtering module 126 executes the filtering application on the resampled images 110 having the original file size. In some embodiments, applying the mask to an image reduced in size may assist in obtaining more time efficient results. Thus, an image of a smaller file size than the resampled images 110 can be filtered by the filtering module 126. In such embodiments, after filtering of the reduced image size is performed, a high resolution image can be restored and blur can be applied by the filtering module 126 to suppress pixilation effects. Such execution of the filtering module 126 can significantly increase the image processing time by the system 100.

In some embodiments, the Laplacian Pyramid composition can be used for the modified local Laplacian filtering of the filtering module 126. In some embodiments, example Equation 2 below can be used to represent the Laplacian filtering performed by the filtering module 126:

$$p\text{New} = 0.5*(p\text{Org}*(1+p\text{New})+p\text{Org}+p\text{New}) \quad (2)$$

where pOrg represents the current level, and pNew represents the upscaled precedent level. In case of a collapse of the Laplacian Pyramid, the filtering module 126 can increase the precedent level to the current level, and the levels can be added together. In some embodiments, the leading coefficient, e.g., constant, (0.5 in example Equation (2)) can be varied based on the desired effect or intensity of the Laplacian filter. After execution of the filtering module 126, the filtered images 112 can each be output and electronically stored in the database 106. The system 100 therefore performs tone mapping on each individual image (e.g., image per image) prior to merging or blending of the images, rather than the traditional process of tone mapping a single image.

The processing device 120 can execute the blending module 128 to receive as input each of the filtered images 112 and the unchanged brightest resampled image 110. The first image received as input by the blending module 128 can be the unchanged brightest resampled image 110 (e.g., the image having the highest exposure value), with such image taken as the basis for the blending process. By using luminance blending (e.g., interpolation), the current image is blended with the next image in a sequence (from light to dark) of the filtered images 112 due to the previously sorted images 104 being arranged by luminance or exposure value reduction. However, it should be understood that in some embodiments the blending module 128 can be executed in the opposing sequence (e.g., from dark to light).

In some embodiments, example Equation 3 below can represent the blending function performed by the blending module 128:

$$p = p2 * p2\_local\_laplacian\_mask + (1 - p2\_local\_laplacian\_mask) * p1 \quad (3)$$

where p is a new image that we will be generated, p1 is a current image (brighter image), p2 is an overlaid image (darker image with lower exposure value), and p2 local_laplacian_mask is a luminance mask of the image p2 filtered with modified local Laplacian filters (received as output from the filtering module 126).

Thus, a new blended image 114 is generated as a result of blending two adjacent images (e.g., two images having adjacent increments of exposure value). The new blended image 114 can be set as the current image, and the blending module 128 procedure can be executed repeatedly with the current image and the next darker image until the end of the set or sequence of images. For example, the next image in a sequence sorted by the exposure value reduction can be blended by Alpha blend based on the created masks. The result is a new merged image having the luminance information of all of the blended images 114. In some embodiments, an image alignment can be performed at each stage of the blending process to ensure the details of the images are aligned in the output blended image.

In some embodiments, each of the blended images generated at each step of the blending process and the resulting new merged image can each be electronically stored as the respective blended/merged images 114. The contrast in each image is preserved since the contrast is contained in the original images. Particularly, the negative modified local Laplacian filtering of the filtering module 126 ensures that any changes in luminance (brightness) does not affect the small details of the images and only applies to bigger objects. As a result, all details in the images output by the blending module 128 have a realistic contrast.

After the merged image 114 is generated by the blending module 128, the processing device 120 can execute the normalization module 130 that receives as input the merged image 114 to improve the visual contrast of the merged image 114. Particularly, the result of merging of the images can be an RGB image with a lack of contrast. In order to obtain a visually pleasant result, contrast normalization can be performed by the normalization module 130 on the merged image 114. In some embodiments, the contrast normalization can be achieved by a "stretching" histogram to restore the contrast in the image, if needed. In some embodiments, the contrast in the merged image 114 may not need to be restored and the normalization step can be skipped.

In some embodiments, example Equation 4 represents the process performed by the normalization module 130 to determine the minimum and maximum values for each channel (R, G, B):

$$\text{new}\_p = (p - \text{minVal})/(\text{maxVal} - \text{minVal}) \quad (4)$$

where new_p represents the new value for current pixel in channel, p represents the current pixel value in channel, minVal represents a minimum value of luminance for the current channel (minVal=min({minR, minG, minB}), and maxVal represents a maximum value of luminance for the current channel (maxVal=max({maxR, maxG, maxB}). Example Equation 4 can be used to determine the new value for each pixel in every channel (R, G, B) separately.

In some embodiments, the normalization module 130 can reduce the image size to 512 pixels by 512 pixels using a nearest point algorithm, and filters the image by a medial filter (e.g., radius of 3 pixels). The normalization module 130 can determine the histogram range (minRGBValue, maxRGBValue) of the created image by a cumulative histogram with a threshold of 0.9995. Using example Equation 4, the image RGB normalization can be performed based on the defined luminance (brightness) range. The image generated by the normalization module 130 can be output and electronically stored as the normalized image 116.

In some embodiments, the normalized image 116 can be considered as and electronically stored as the enhanced image 118 having the luminance information of all input images 104. In some embodiments, the normalized image 116 can be received as input to the post-processing module 132 executed by the processing device 120 to further enhance the normalized image 116. In some embodiments, the post-processing module 132 can be executed to apply additional correction tools/filters (e.g., automatic white balance for correction of the captured color temperature, sharpness and/or detail recovery to increase the image sharpness, combinations thereof, or the like) to the normalized image to generate an enhanced image 118 having realistic features. In some embodiments, the result of the enhancement process performed on the input image 104 can include improvement of the clarify or haze in the input image 104 (e.g., dehazing of the original image) such that a clearer enhanced image 118 is generated by the system 100. Thus, the exemplary process performed by the system 100 to enhance an input image 104 can remove substantially all haze in the image, resulting in an enhanced image 118 having haze-free or substantially haze-free features.

In some embodiments, the system 100 can be implemented with only a single input image 104. In such embodiments, a method similar to the realistic high quality automatic bracketed exposures merge discussed above can be performed by the system 100. The EV resampling module 124 can be executed by the processing device 120 to generate a virtual exposures bracket from the single input image 104. In some embodiments, the range of exposure values generated by the EV resampling module 124 can be from −3.0 to +3.0, including images having equal increments or steps of the exposure values. In some embodiments, the −3.0 to +3.0 range of exposure values can be generated for RAW files because RAW files have a broad dynamic range (12 or 14 bit). In some embodiments, a −2.0 to +2.0 range of exposure values can be generated for non-RAW files (e.g., TIFF, JPG, or the like).

The size of the exposure value increments for generating the brackets sequence can vary based on the type of file used and/or the output quality expected (e.g., 0.5 increments, 1.0 increments, 1.5 increments, or the like). Larger increments of the exposure value are not preferred to avoid data loss. As an example, a single input image 104 received as input to the EV resampling module 124 can be used to generate resampled images 110 having exposure value increments of 1.0 (e.g., −3.0, −2.0, −1.0, 0.0, +1.0, +2.0 and +3.0 exposure values for RAW files; or −2.0, −1.0, 0.0, +1.0 and +2.0 exposure values for non-RAW files).

The generated resampled images 110 can be used as input for the blending module 128 as described above, with the blending module 128, the normalization module 130 and, optionally, the post-processing module 132 executed by the processing device 120 to generate the enhanced image 118. In some embodiments, prior to blending, the luminosity mask module 125 and/or the filtering module 126 can be executed. The single input image 104 enhanced by the system 100 results in an image having a realistic output where the tone balance in the image is restored, luminance correction of the image is performed, and details correction of the image is performed. Highlights and shadows in the image can also be corrected automatically based on execution of the modules 124-132 of the system 100.

Figure 2:
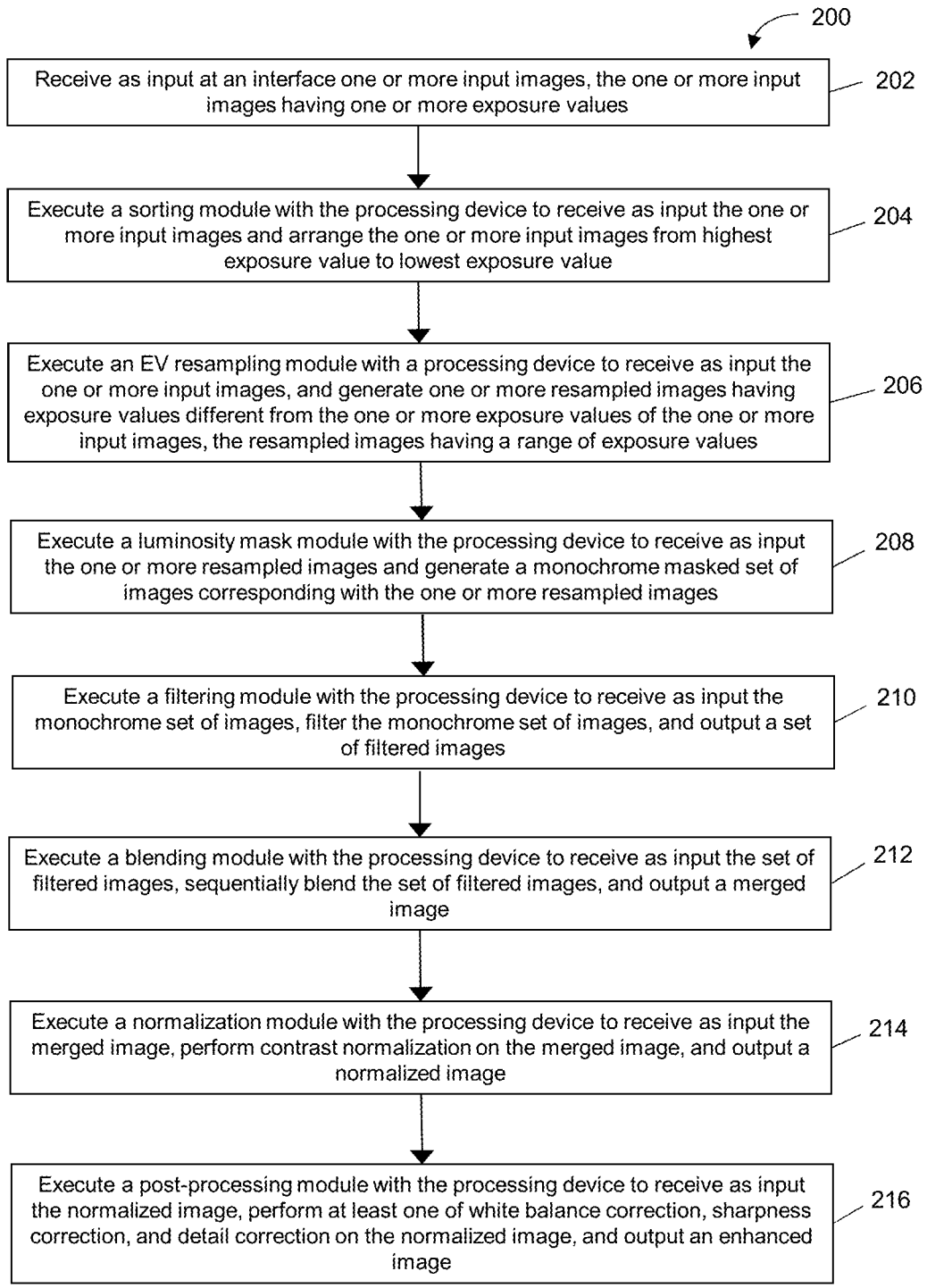
FIG. 2 is a flowchart illustrating an example process of implementing a system of image enhancement in accordance with the present disclosure.

FIG. 2 is a flowchart illustrating an example process 200 of implementing the system 100. To begin, at step 202, receive as input at an interface device one or more input images. The one or more input images have one or more exposure values. At step 204, execute a sorting module with the processing device to receive as input the one or more input images, and arrange the one or more input images from highest exposure value to lowest exposure value. At step 206, execute an EV resampling module with a processing device to receive as input the one or more input images, and generate one or more resampled images having exposure values different from the one or more exposure values of the one or more input images. The one or more resampled images have a range of exposure values. In some embodiments, the resampled images are generated to form equal exposure value increments and only the resampled images are used for subsequent processing. In some embodiments, the resampled images are generated to fill in the gaps of exposure values between the input images such that equal exposure value increments are formed between the resampled images and one or more of the input images. In such embodiments, the resampled images and the one or more input images form a set of resampled images having a range of exposure values that are subsequently processed by the system.

At step 208, execute a luminosity mask module with the processing device to receive as input the one or more resampled images and generate a monochrome masked set of images (e.g., luminosity representations of the resampled images) corresponding with the one or more resampled images. At step 210, execute a filtering module with the processing device to receive as input the set of monochrome images, filter the set of monochrome images, and output a set of filtered images. At step 212, execute a blending module with the processing device to receive as input the set of filtered images, sequentially blend the set of filtered images, and output a merged image. At step 214, execute a normalization module with the processing device to receive as input the merged image, perform contrast normalization on the merged image, and output a normalized image. Optionally, at step 216, execute a post-processing module with the processing device to receive as input the normalized image, perform at least one of white balance correction, sharpness correction, and detail correction on the normalized image, and output an enhanced image.

Figure 3A:
FIGS. 3A-3C are example input images at a range of different exposure values prior to execution of an EV resampling module of an image enhancement system, including an exposure value of −2.0 (FIG. 3A), an exposure value of 0.0 (FIG. 3B), and an exposure value of +2.0 (FIG. 3C).
Figure 3B:
Figure 3C:
Figure 4A:
FIGS. 4A-4D are example EV resampled images at a range of different exposure values after execution of an EV resampling module of an image enhancement system, including an exposure value of −2.0 (FIG. 4A), an exposure value of −0.67 (FIG. 4B), an exposure value of +0.67 (FIG. 4C), and an exposure value of +2.0 (FIG. 4D).
Figure 4B:
Figure 4C:
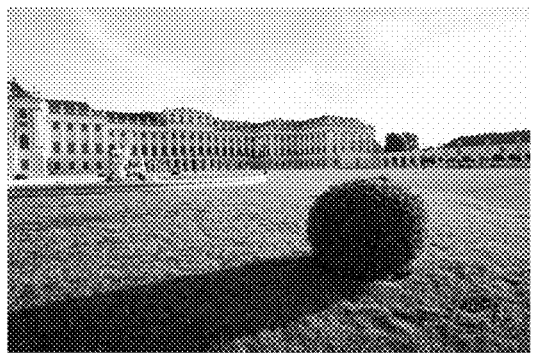
Figure 4D:
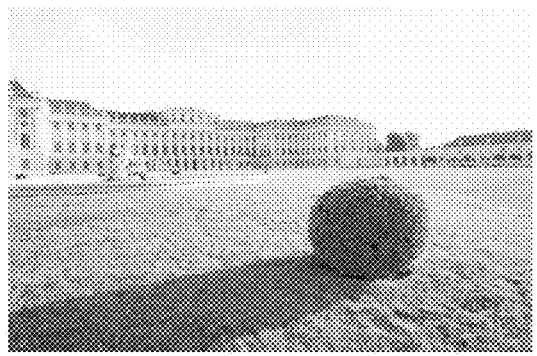

FIGS. 3A-3C are example input images at a range of different exposure values prior to execution of the EV resampling module of the system 100. Particularly, FIG. 3A shows an input image having an exposure value of −2.0, FIG. 3B shows an input image having an exposure value of 0.0, and FIG. 3C shows an input image having an exposure value of −2.0. Because the input images of FIGS. 3A-3C encompass an exposure value range from −2.0 to +2.0 at an exposure value increment or step of 2.0, generation of the resampling images can be performed to fill in gaps and reduce the exposure value increment between the images.

FIGS. 4A-4D are example EV resampled images at a range of different exposure values after execution of the EV resampling module of the system 100. Particularly, FIG. 4A has an exposure value of −2.0, FIG. 4B has an exposure value of −0.67, FIG. 4C has an exposure value of +0.67, and FIG. 4D has an exposure value of +2.0.

Figure 5A:
FIGS. 5A-5C are example luminosity mask images at a range of different exposure values after execution of a luminosity mask module of an image enhancement system, including an exposure value of −2.0 (FIG. 5A), an exposure value of −0.67 (FIG. 5B), and an exposure value of +0.67 (FIG. 5C).
Figure 5B:
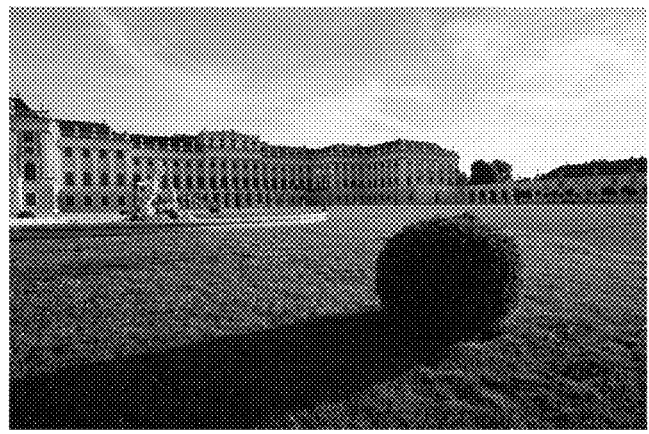
Figure 5C:

FIGS. 5A-5C are example luminosity mask images at a range of different exposure values after execution of the luminosity mask module of the system 100, including an exposure value of −2.0 (FIG. 5A), an exposure value of −0.67 (FIG. 5B), and an exposure value of +0.67 (FIG. 5C). As noted above, during execution of the luminosity mask module, the brightest image of the EV resampled images (e.g., exposure value of +2.0) remains unchanged as the base image, with the remaining images undergoing processing by the luminosity mask module.

Figure 6A:
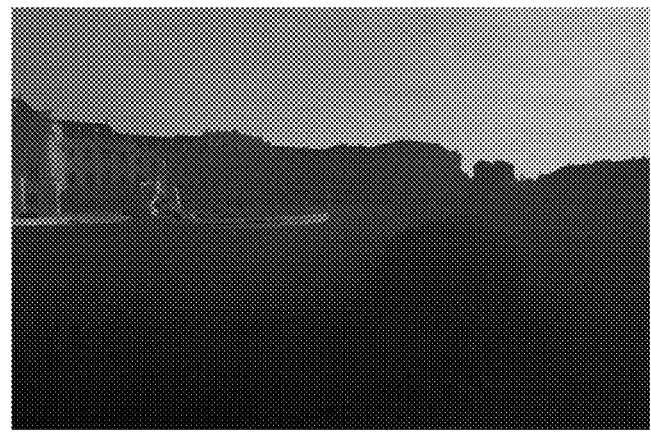
FIGS. 6A-6C are example images at a range of different exposure values after execution of a filtering module of an image enhancement system, including an exposure value of −2.0 (FIG. 6A), an exposure value of −0.67 (FIG. 6B), and an exposure value of +0.67 (FIG. 6C).
Figure 6B:
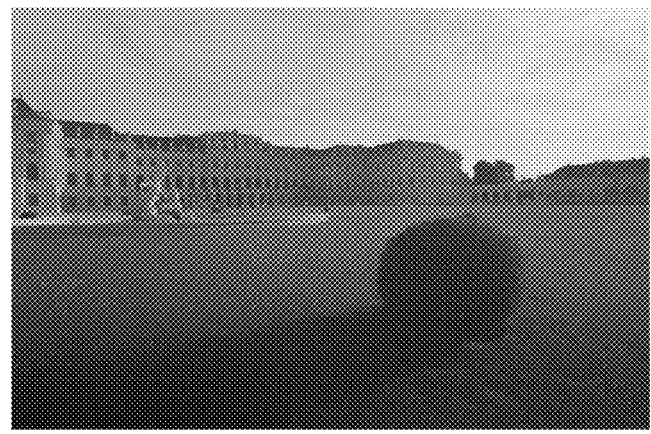
Figure 6C:
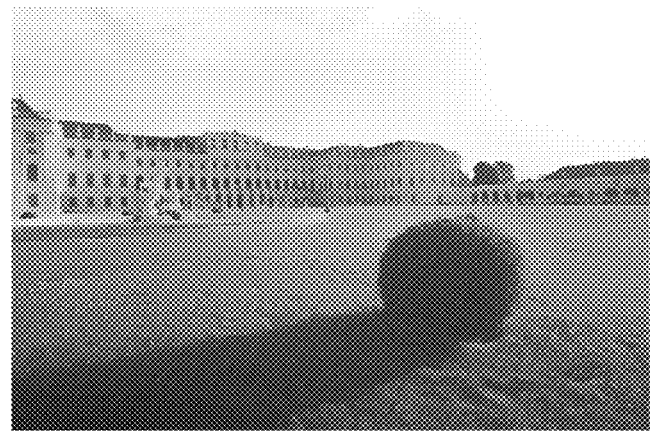

FIGS. 6A-6C are example images at a range of different exposure values after execution of the filtering module of the system 100. Particularly, FIG. 6A shows a filtered image having an exposure value of −2.0, FIG. 6B shows a filtered image having an exposure value of −0.67, and FIG. 6C shows a filtered image having an exposure value of +0.67. As noted above, the filtering performed by the filtering module is modified local Laplacian filtering. The brightest EV resampled image remains unchanged as the base image, with only the luminosity mask images undergoing filtering with the filtering module.

Figure 7A:
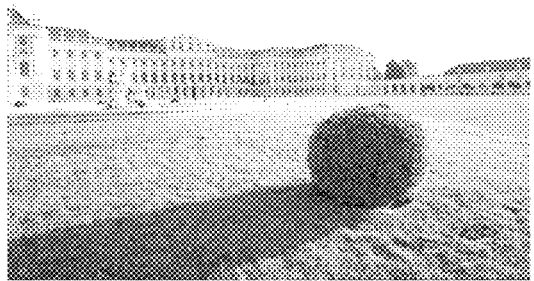
FIGS. 7A-7D are example images during execution of a blending module of an image enhancement system, starting with blending of the highest exposure value images (FIG. 7A) and sequentially blending with the remaining images up to the lowest exposure value image (FIG. 7D).
Figure 7B:
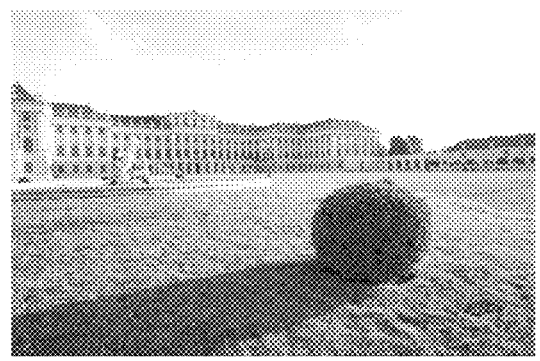
Figure 7C:
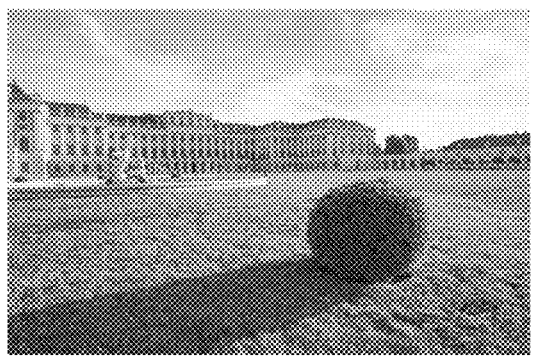
Figure 7D:
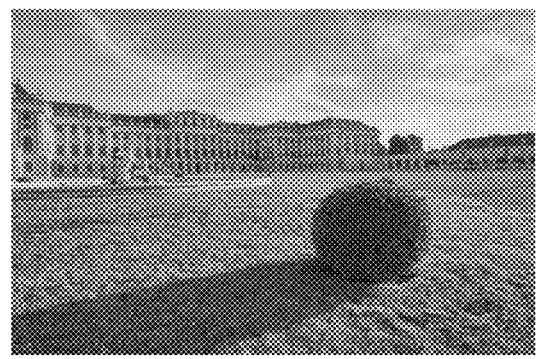

FIGS. 7A-7D are example images during execution of the blending module of the system 100. Blending of the filtered images output from the filtering module begins with the highest exposure value image (FIG. 4D, the unchanged brightest resampled image) and sequentially blending with the remaining images of the filtered images up to the lowest exposure value image (FIG. 6A). Particularly, FIG. 7A shows the base image having the highest exposure value, and FIG. 7B shows the base image of FIG. 7A blended with an image having the next highest exposure value. Blending of the images is performed sequentially until the blended or merged image is shown in FIG. 7D.

Figure 8:
FIG. 8 is an example blended image output from a blending module of an image enhancement system.
Figure 9:
FIG. 9 is an example normalized image output from a normalization module of an image enhancement system.

FIG. 8 is an example blended image (e.g., merged image) output from the blending module of the system 100. Although the blended image includes all of the luminance information from the input images of FIGS. 3A-3C, contrast loss due to the resampling and blending process can be seen in the blended image. Performing contrast normalization on the blended image using the normalization module corrects any contrast losses in the image. FIG. 9 is an example normalized image (e.g., a final enhanced image) output from the normalization module of the system 100. Although not shown, it should be understood that additional post-processing (e.g., white balance correction, sharpness correction, detail correction, or the like) can be performed on the normalized image to further enhance the enhanced image.

Figure 10A:
FIGS. 10A-10C are example input images at a range of different exposure values prior to execution of an EV resampling module of an image enhancement system, including an exposure value of −2.3 (FIG. 10A), an exposure value of −0.3 (FIG. 10B), and an exposure value of +1.7 (FIG. 10C).
Figure 10B:
Figure 10C:
Figure 11A:
FIGS. 11A-11E are example EV resampled images at a range of different exposure values after execution of an EV resampling module of an image enhancement system, including an exposure value of −2.83 (FIG. 11A), an exposure value of −1.58 (FIG. 11B), an exposure value of −0.33 (FIG. 11C), an exposure value of +0.92 (FIG. 11D), and an exposure value of 2.17 (FIG. 11E).
Figure 11B:
Figure 11C:
Figure 11D:
Figure 11E:

FIGS. 10A-10C are example input images at a range of different exposure values prior to execution of the EV resampling module of the system 100, including an exposure value of −2.3 (FIG. 10A), an exposure value of −0.3 (FIG. 10B), and an exposure value of +1.7 (FIG. 10C). FIGS. 11A-11E are example images generated by the EV resampling module of the system 100, including an exposure value of −2.83 (FIG. 11A), an exposure value of −1.58 (FIG. 11B), an exposure value of −0.33 (FIG. 11C), an exposure value of +0.92 (FIG. 11D), and an exposure value of 2.17 (FIG. 11E).

Figure 12A:
FIGS. 12A-12D are example luminosity mask images at a range of different exposure values after execution of a luminosity mask module of an image enhancement system, including an exposure value of −2.83 (FIG. 12A), an exposure value of −1.58 (FIG. 12B), an exposure value of −0.33 (FIG. 12C), and an exposure value of +0.92 (FIG. 12D).
Figure 12B:
Figure 12C:
Figure 12D:

FIGS. 12A-12D are example luminosity mask images at a range of different exposure values after execution of the luminosity mask module of the system 100, including an exposure value of −2.83 (FIG. 12A), an exposure value of −1.58 (FIG. 12B), an exposure value of −0.33 (FIG. 12C), and an exposure value of +0.92 (FIG. 12D). The brightest EV resampled image (FIG. 11E) is maintained as the base image without processing, while the remaining resampled images (FIGS. 11A-11D) are processed by the luminosity mask.

Figure 13A:
FIGS. 13A-13D are example images at a range of different exposure values after execution of a filtering module of an image enhancement system, including an exposure value of −2.83 (FIG. 13A), an exposure value of −1.58 (FIG. 13B), an exposure value of −0.33 (FIG. 13C), and an exposure value of +0.92 (FIG. 13D).
Figure 13B:
Figure 13C:
Figure 13D:

FIGS. 13A-13D are example images at a range of different exposure values after execution of the filtering module of the system 100, including an exposure value of −2.83 (FIG. 13A), an exposure value of −1.58 (FIG. 13B), an exposure value of −0.33 (FIG. 13C), and an exposure value of +0.92 (FIG. 13D). As noted above, the filtering performed by the filtering module is modified local Laplacian filtering.

Figure 14A:
FIGS. 14A-14E are example images during execution of a blending module of an image enhancement system, starting with blending of the highest exposure value images (FIG. 14A) and sequentially blending with the remaining images up to the lowest exposure value image (FIG. 14E).
Figure 14B:
Figure 14C:
Figure 14D:
Figure 14E:

FIGS. 14A-14E are example images during execution of a blending module of an image enhancement system, starting with blending of the highest exposure value images (FIG. 14A) and sequentially blending with the remaining images up to the lowest exposure value image (FIG. 14E). As noted above, blending begins with the EV resampled image having the highest exposure value being blended with the filtered image having the highest exposure value, and sequentially blending until the filtered image with the lowest exposure value is reached.

Figure 15:
FIG. 15 is an example blended image output from a blending module of an image enhancement system.
Figure 16:
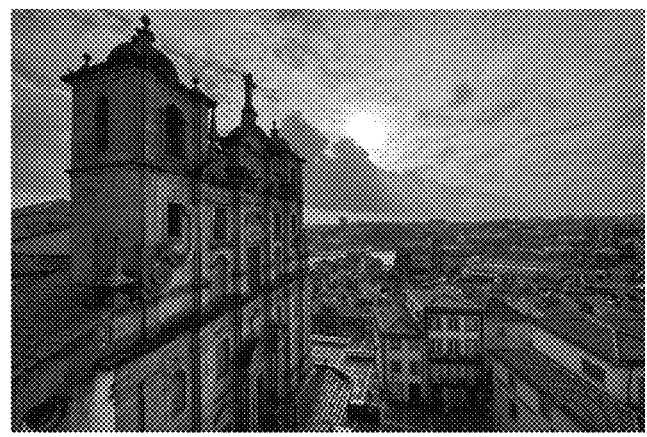
FIG. 16 is an example normalized image output from a normalization module of an image enhancement system.

FIG. 15 is an example blended image output from the blending module of the system 100. The blended image includes all of the luminance information from the input images of FIGS. 10A-10C. The blended image can be contrast normalized using the normalization module to correct any contrast loss during processing. FIG. 16 is an example normalized image output from the normalization module of the system 100. Although not shown, it should be understood that additional post-processing (e.g., white balance correction, sharpness correction, detail correction, or the like) can be performed on the normalized image to further enhance the enhanced image.

Figure 17:
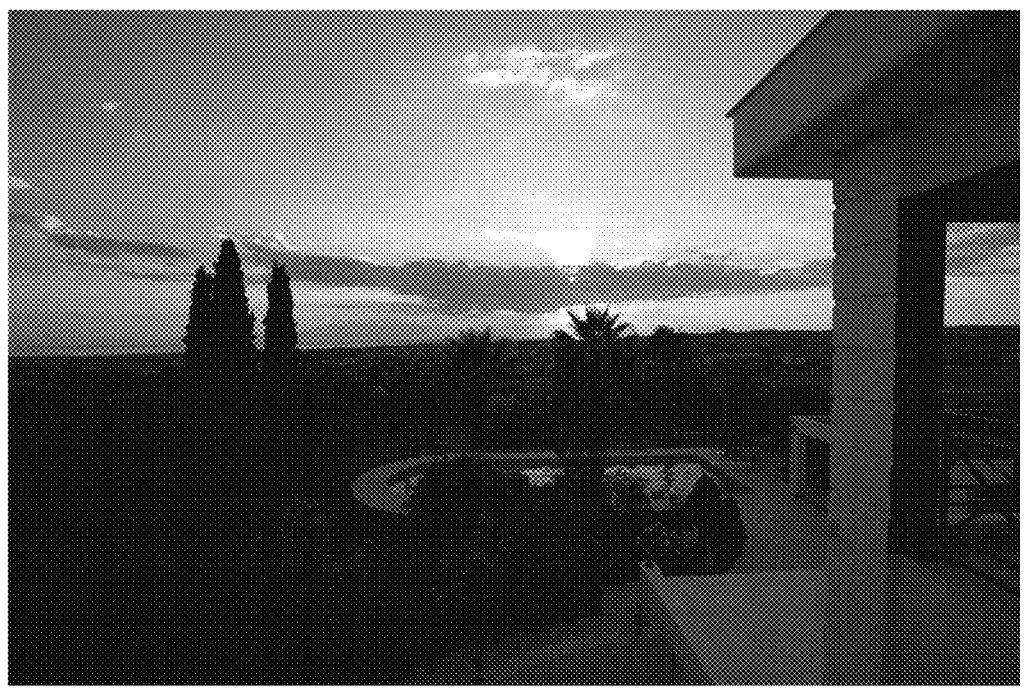
FIG. 17 is an example input image prior to execution of an EV resampling module of an image enhancement system, including an exposure value of 0.0.
Figure 18A:
FIGS. 18A-18E are example EV resampled images at a range of different exposure values after execution of an EV resampling module of an image enhancement system, including an exposure value of −3.0 (FIG. 18A), an exposure value of −1.5 (FIG. 18B), an exposure value of 0.0 (FIG. 18C), an exposure value of +1.5 (FIG. 18D), and an exposure value of 3.0 (FIG. 18E).
Figure 18B:
Figure 18C:
Figure 18D:
Figure 18E:

In some embodiments, the system 100 can be used to enhance a single input image. FIG. 17 is an example single input image prior to execution of an EV resampling module of the system 100. The input image can have an exposure value of 0.0. FIGS. 18A-18E are example EV resampled images at a range of different exposure values after execution of the EV resampling module of the system 100, including an exposure value of −3.0 (FIG. 18A), an exposure value of −1.5 (FIG. 18B), an exposure value of 0.0 (FIG. 18C), an exposure value of +1.5 (FIG. 18D), and an exposure value of 3.0 (FIG. 18E). The resampled images provide additional images within an exposure value range of −3.0 to +3.0, with the set of resampled images for subsequent processing including the original input image having the exposure value of 0.0.

Figure 19A:
FIGS. 19A-19D are example luminosity mask images at a range of different exposure values after execution of a luminosity mask module of an image enhancement system, including an exposure value of −3.0 (FIG. 19A), an exposure value of −1.5 (FIG. 19B), an exposure value of 0.0 (FIG. 19C), and an exposure value of +1.5 (FIG. 19D).
Figure 19B:
Figure 19C:
Figure 19D:
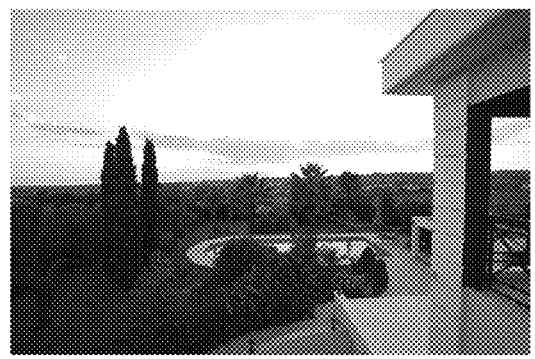
Figure 20A:
FIGS. 20A-20D are example images at a range of different exposure values after execution of a filtering module of an image enhancement system, including an exposure value of −3.0 (FIG. 19A), an exposure value of −1.5 (FIG. 19B), an exposure value of 0.0 (FIG. 19C), and an exposure value of +1.5 (FIG. 19D).
Figure 20B:
Figure 20C:
Figure 20D:
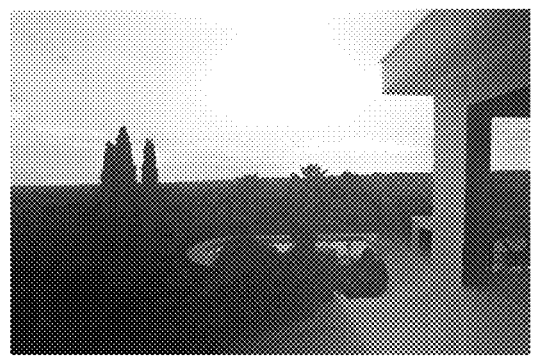

FIGS. 19A-19D are example luminosity mask images at a range of different exposure values after execution of the luminosity mask module of the system 100, including an exposure value of −3.0 (FIG. 19A), an exposure value of −1.5 (FIG. 19B), an exposure value of 0.0 (FIG. 19C), and an exposure value of +1.5 (FIG. 19D). As noted above, the resampled image having the highest exposure value (e.g., +3.0) remains unchanged without introduction into the luminosity mask module, and is used as a base image during the blending process.

FIGS. 20A-20D are example images at a range of different exposure values after execution of the filtering module of the system 100, including an exposure value of −3.0 (FIG. 19A), an exposure value of −1.5 (FIG. 19B), an exposure value of 0.0 (FIG. 19C), and an exposure value of +1.5 (FIG. 19D). As noted above, the filtering performed by the filtering module is modified local Laplacian filtering. Only the masked images are filtered by the filtering module, with the base image remaining unchanged.

Figure 21A:
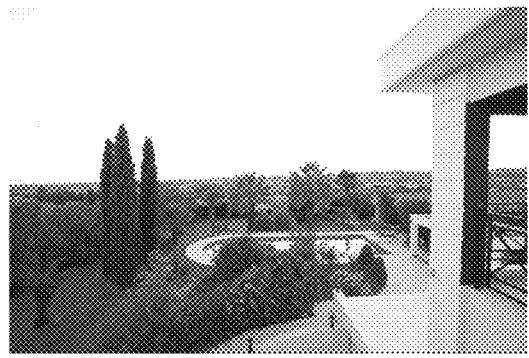
FIGS. 21A-21E are example images during execution of a blending module of an image enhancement system, starting with blending of the highest exposure value images (FIG. 21A) and sequentially blending with the remaining images up to the lowest exposure value image (FIG. 21E).
Figure 21B:
Figure 21C:
Figure 21D:
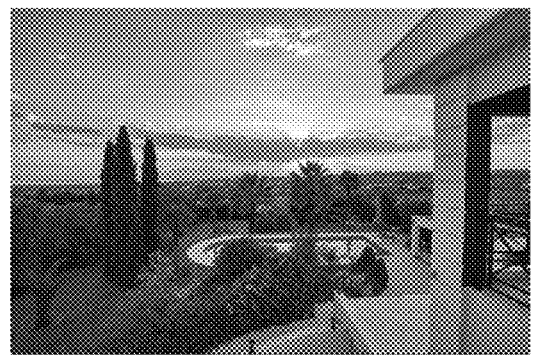
Figure 21E:
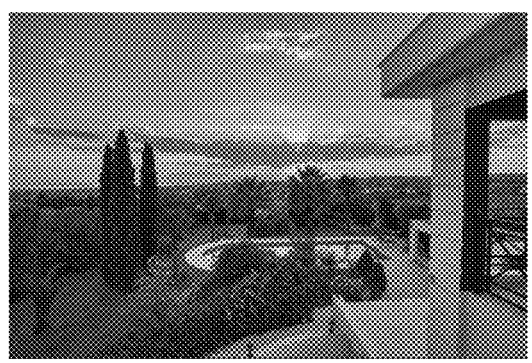

FIGS. 21A-21E are example images during execution of the blending module of the system 100, starting with blending of the highest exposure value images (FIG. 21A) and sequentially blending with the remaining images up to the lowest exposure value image (FIG. 21E). The unchanged base image is initially blended with the filtered image having the highest exposure value, and the resulting merged image blended sequentially with the filtered image having the next highest exposure value until the filtered image with the lowest exposure value is reached.

Figure 22:
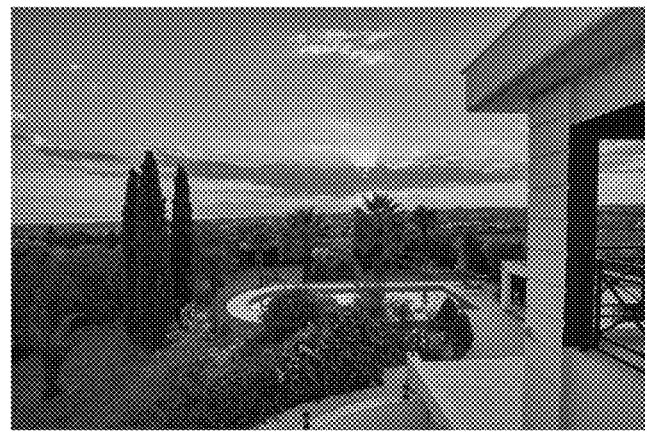
FIG. 22 is an example blended image output from a blending module of an image enhancement system.
Figure 23:
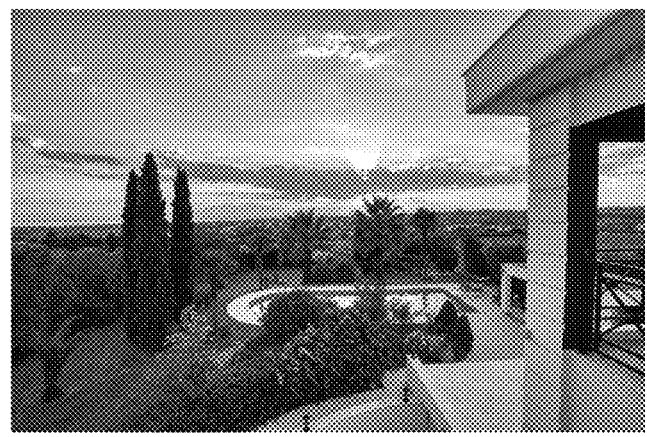
FIG. 23 is an example normalized image output from a normalization module of an image enhancement system.

FIG. 22 is an example blended image output from the blending module of the system 100. The blended image includes all of the luminance information from the input image and the resampled images. The blended image can be contrast normalized using the normalization module to correct any contrast loss during processing. FIG. 23 is an example normalized image output from the normalization module of the system 100. Although not shown, it should be understood that additional post-processing (e.g., white balance correction, sharpness correction, detail correction, or the like) can be performed on the normalized image to further enhance the enhanced image.

Figure 24:
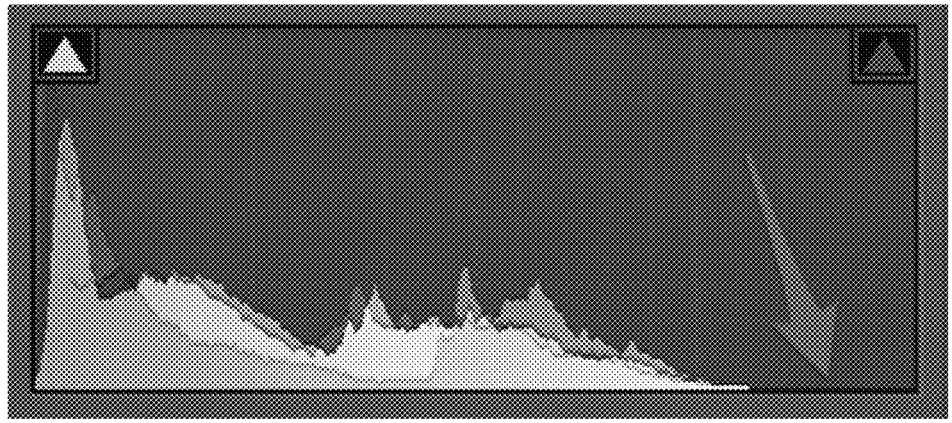
FIG. 24 is an example histogram for a brightest image of a set of input images generated during execution of an EV resampling module of an image enhancement system.
Figure 25:
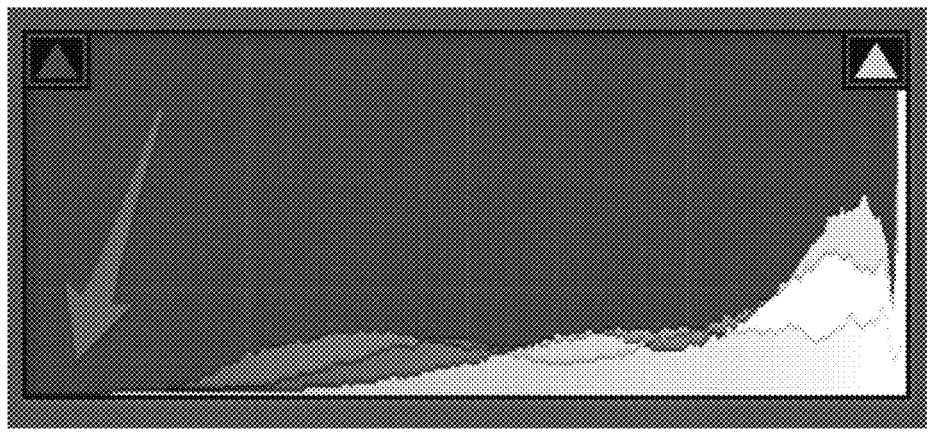
FIG. 25 is an example histogram for a darkest image of a set of input images generated during execution of an EV resampling module of an image enhancement system.

In some embodiments, during the EV resampling process, histograms can be generated by the EV resampling module to automatically detect the EV resampling range. To ensure that the generated images cover the desired dynamic range, the EV resampling module can create the resampled images until the desired brightest and darkest images are generated. The brightest and darkest images desired can be determined based on the histograms generated by the EV resampling module and shown in FIGS. 24 and 25.

For the brightest image (FIG. 24), the brightest pixel of the image can be slightly darker than pure white. The histogram can be shifted to the left and new images can be created with the EV resampling module with the set increment (positive EV) until the image having the brightest pixel slightly darker than pure white is reached. For the darkest image (FIG. 25), the darkest pixel of the image can be slightly brighter than pure black. The histogram can be shifted to the right and new images can be created with the EV resampling module with the set increment (negative EV) until the image having the darkest pixel slightly brighter than pure black is reached. Such histogram generation and process can be performed for both multi-image inputs and single-image inputs.

Figure 26:
FIG. 26 is an example input image prior to enhancement with an image enhancement system.
Figure 27:
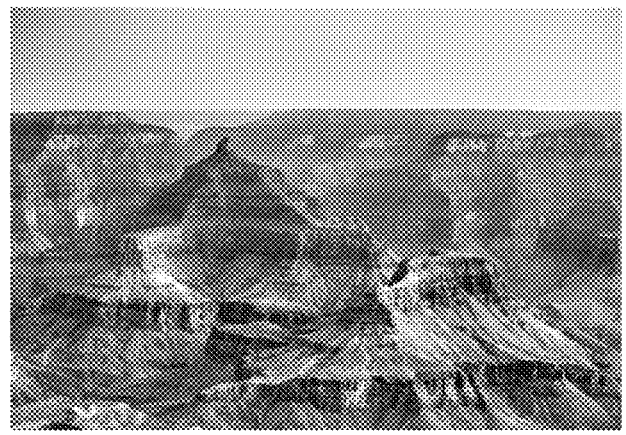
FIG. 27 is an example output image after enhancement with an image enhancement system.

In some embodiments, the disclosed image enhancement of the system 100 can perform haze correction on the input image. As an example, FIG. 26 shows an input image prior to enhancement with the system 100, and FIG. 27 shows an example image after enhancement with the system 100. The EV resampling, luminosity mask, filtering, blending, normalization, and/or post-processing steps can remove all or substantially all haze in the input image, resulting in a clearer and substantially haze-free output enhanced image.

Thus, the resulting enhanced image generated by the system 100 has a clearer representation with a substantial reduction in haze.

Figure 28:
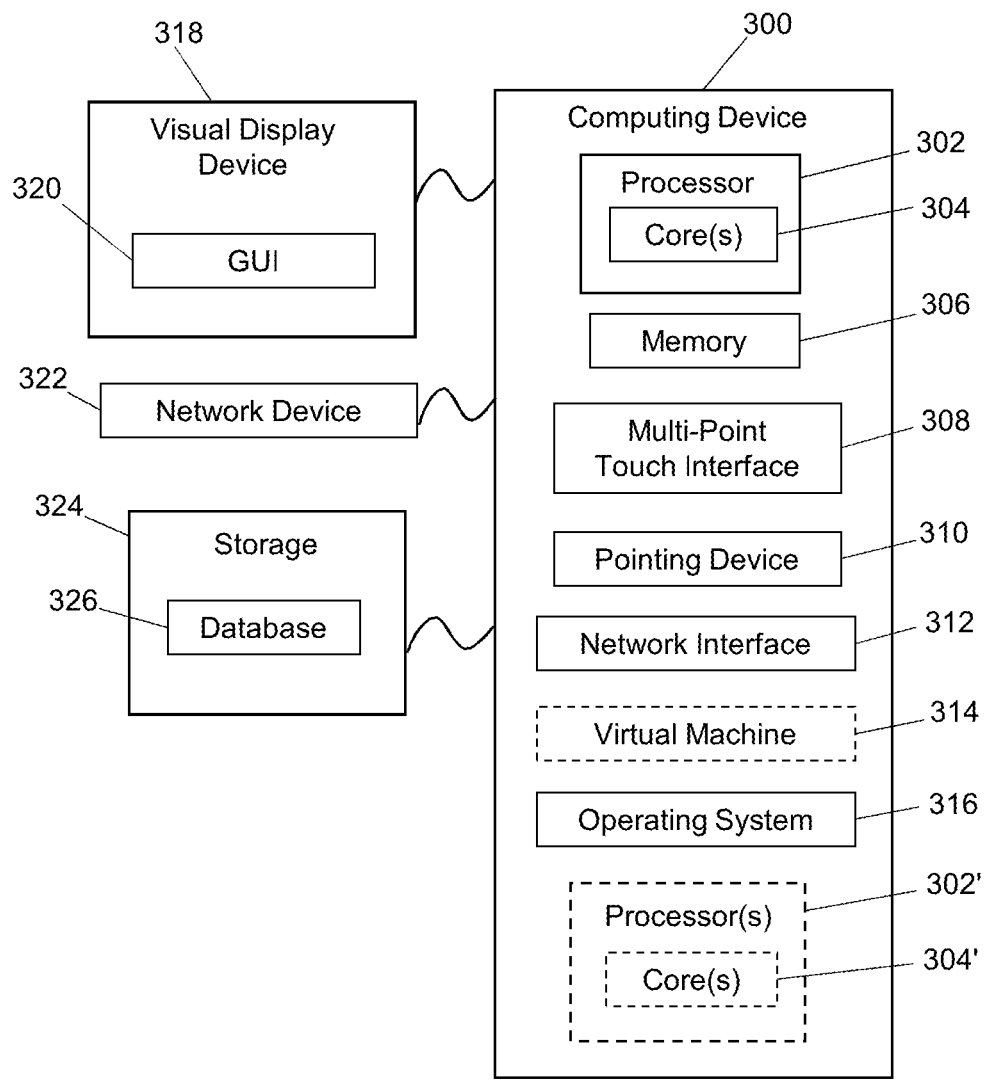
FIG. 28 is a block diagram of an example computing device for implementing the example system of image enhancement in accordance with the present disclosure.

FIG. 28 is a block diagram of a computing device 300 in accordance with example embodiments of the present disclosure. The computing device 300 includes one or more non-transitory computer-readable media for storing one or more computer-executable instructions or software for implementing example embodiments. The non-transitory computer-readable media may include, but are not limited to, one or more types of hardware memory, non-transitory tangible media (for example, one or more magnetic storage disks, one or more optical disks, one or more flash drives), and the like. For example, memory 306 included in the computing device 300 may store computer-readable and computer-executable instructions or software for implementing example embodiments of the present disclosure (e.g., instructions for operating the camera, instructions for operating the sorting module, instructions for operating the EV resampling module, instructions for operating the luminosity mask module, instructions for operating the filtering module, instructions for operating the blending module, instructions for operating the normalization module, instructions for operating the post-processing module, instructions for operating the processing device, instructions for operating the communication interface, instructions for operating the user interface, instructions for operating the central computing system, combinations thereof, or the like). The computing device 300 also includes configurable and/or programmable processor 302 and associated core 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' may each be a single core processor or multiple core (304 and 304') processor.

Virtualization may be employed in the computing device 300 so that infrastructure and resources in the computing device 300 may be shared dynamically. A virtual machine 314 may be provided to handle a process running on multiple processors so that the process appears to be using only one computing resource rather than multiple computing resources. Multiple virtual machines may also be used with one processor. Memory 306 may include a computer system memory or random access memory, such as DRAM, SRAM, EDO RAM, and the like. Memory 306 may include other types of memory as well, or combinations thereof.

A user may interact with the computing device 300 through a visual display device 318 (e.g., a personal computer, a mobile smart device, or the like), such as a computer monitor, which may display at least one user interface 320 (e.g., a graphical user interface) that may be provided in accordance with example embodiments. The computing device 300 may include other I/O devices for receiving input from a user, for example, a camera, a keyboard, microphone, or any suitable multi-point touch interface 308, a pointing device 310 (e.g., a mouse). The keyboard 308 and the pointing device 310 may be coupled to the visual display device 318. The computing device 300 may include other suitable conventional I/O peripherals.

The computing device 300 may also include at least one storage device 324, such as a hard-drive, CD-ROM, eMMC (MultiMediaCard), SD (secure digital) card, flash drive, non-volatile storage media, or other computer readable media, for storing data and computer-readable instructions and/or software that implement example embodiments of the image enhancement system described herein. Example storage device 324 may also store at least one database 326 for storing any suitable information required to implement example embodiments. For example, example storage device 324 can store at least one database 326 for storing information, such as data relating to input images, sorted images, resampled images, masked images, filtered images, blended/merged images, normalized images, enhanced images, combinations thereof, or the like, and computer-readable instructions and/or software that implement example embodiments described herein. The databases 326 may be updated by manually or automatically at any suitable time to add, delete, and/or update one or more items in the databases.

The computing device 300 can include a network interface 312 configured to interface via at least one network device 322 with one or more networks, for example, a Local Area Network (LAN), a Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 312 may include a built-in network adapter, a network interface card, a PCMCIA network card, Pa CI/PCIe network adapter, an SD adapter, a Bluetooth adapter, a card bus network adapter, a wireless network adapter, a USB network adapter, a modem or any other device suitable for interfacing the computing device 300 to any type of network capable of communication and performing the operations described herein. Moreover, the computing device 300 may be any computer system, such as a workstation, desktop computer, server, laptop, handheld computer, tablet computer (e.g., the tablet computer), mobile computing or communication device (e.g., the smart phone communication device), an embedded computing platform, or other form of computing or telecommunications device that is capable of communication and that has sufficient processor power and memory capacity to perform the operations described herein.

The computing device 300 may run any operating system 316, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In example embodiments, the operating system 316 may be run in native mode or emulated mode. In an example embodiment, the operating system 316 may be run on one or more cloud machine instances.

Figure 29:
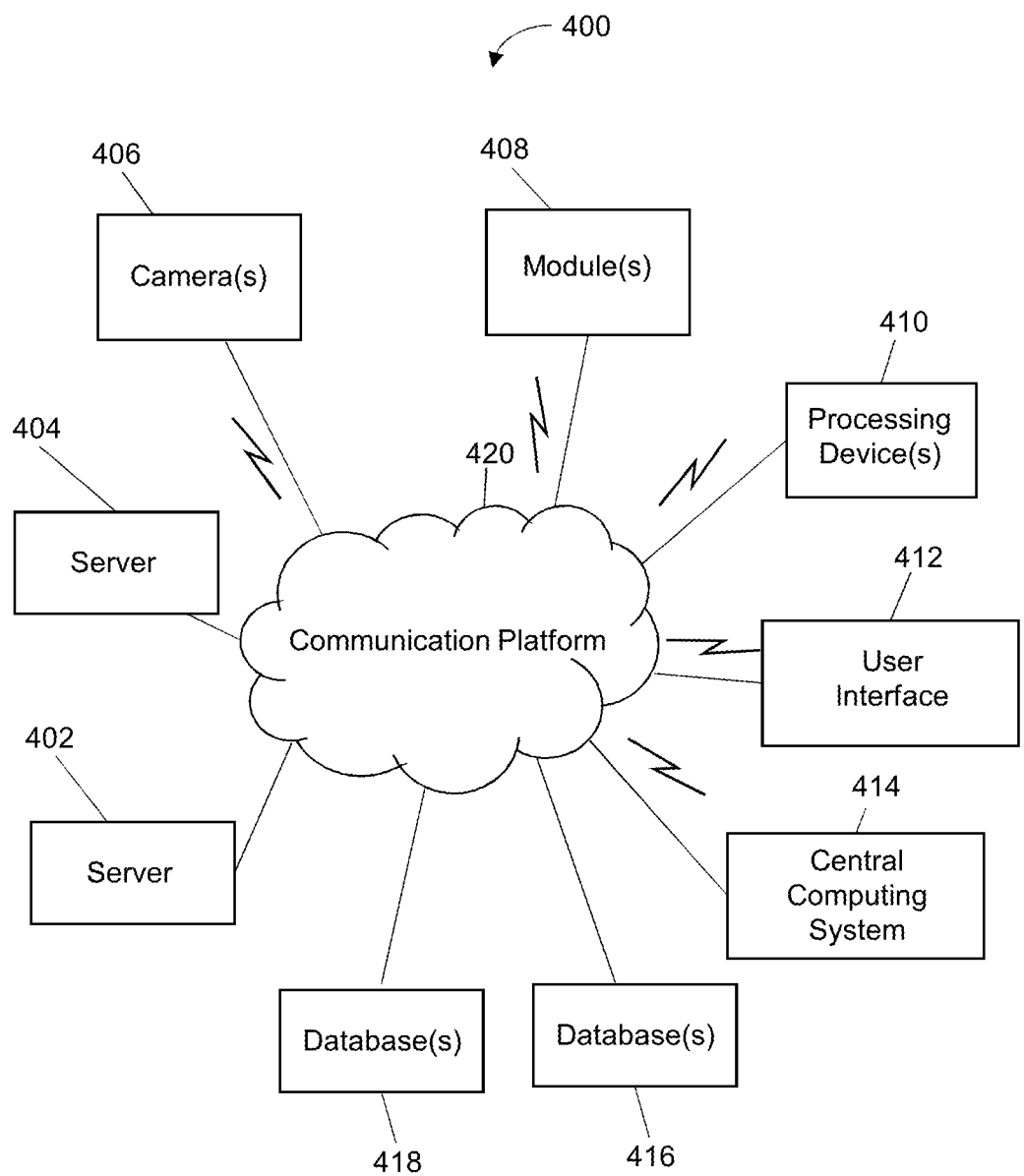
FIG. 29 is a block diagram of an example image enhancement system environment in accordance with the present disclosure.

FIG. 29 is a block diagram of an example image enhancement system environment 400 in accordance with example embodiments of the present disclosure. The environment 400 can include servers 402, 404 configured to be in communication with one or more cameras 406, one or more modules 408, at least one processing device 410, a user interface 412, and a central computing system 414 via a communication platform 420, which can be any network over which information can be transmitted between devices communicatively coupled to the network. For example, the communication platform 420 can be the Internet, Intranet, virtual private network (VPN), wide area network (WAN), local area network (LAN), and the like. In some embodiments, the communication platform 420 can be part of a cloud environment.

The environment 400 can include repositories or databases 416, 418, which can be in communication with the servers 402, 404, as well as the one or more cameras 406, one or more modules 408, at least one processing device 410, a user interface 412, and a central computing system 414, via the communications platform 420.

In example embodiments, the servers 402, 404, one or more cameras 406, one or more modules 408, at least one processing device 410, a user interface 412, and a central computing system 414 can be implemented as computing devices (e.g., computing device 300). Those skilled in the art will recognize that the databases 416, 418 can be incorporated into at least one of the servers 402, 404. In some embodiments, the databases 416, 418 can store data relating to input images, sorted images, resampled images, masked images, filtered images, blended/merged images, normalized images, enhanced images, combinations thereof, or the like, and such data can be distributed over multiple databases 416, 418.

While example embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A system of image enhancement, comprising:
an interface device configured to receive as input one or more input images, the one or more input images having one or more exposure values; and
a processing device in communication with the interface device, the processing device configured to:
(i) execute an exposure value (EV) resampling module to receive as input the one or more input images, and generate one or more resampled images, each of the one or more resampled images having an altered exposure value for the entire resampled image that is different from the one or more exposure values of the one or more input images, and the resampled images having a range of exposure values;
(ii) execute a filtering module to receive as input the resampled images, filter the resampled images, and output a set of filtered images; and
(iii) execute a blending module to receive as input the set of filtered images, sequentially blend the set of filtered images, and output a merged image.

2. The system of claim 1, wherein the one or more input images comprise a single input image having a single exposure value, and the exposure values of the one or more resampled images are incrementally greater and smaller in exposure value than the single exposure value of the single input image.

3. The system of claim 1, wherein the one or more input images comprise two or more input images having different input exposure values, and the exposure values of the one or more resampled images are incrementally different from the input exposure values to complete the range of exposure values.

4. The system of claim 1, wherein the processing device is configured to execute a sorting module to receive as input the one or more input images and arrange the one or more input images from highest exposure value to lowest exposure value.

5. The system of claim 1, wherein the one or more resampled images generated by the EV resampling module incrementally fill exposure value gaps between the one or more input images to complete the range of exposure values.

6. The system of claim 1, wherein the resampled images comprise equal exposure value increments within the range of exposure values.

7. The system of claim 1, wherein the processing device is configured to execute a luminosity mask module to receive as input the one or more resampled images and generate a monochrome masked set of images corresponding with the one or more resampled images.

8. The system of claim 6, wherein the equal exposure value increments are 0.5.

9. The system of claim 6, wherein the equal exposure value increments are 1.0.

10. The system of claim 1, wherein the filtering module generates a monochrome luminance representation of each of the images of the resampled images, and filters the monochrome luminance representation of the resampled images.

11. The system of claim 1, wherein the filtering module applies a modified local Laplacian filter to filter the set of resampled images.

12. The system of claim 1, wherein the blending module defines an image of the set of filtered images having a highest exposure value as a base image for blending, and blends the base image with an adjacent image having an incrementally lower exposure value.

13. The system of claim 1, wherein the merged image includes luminance information of each of the set of resampled images.

14. The system of claim 1, wherein the processing device is configured to execute a normalization module to receive as input the merged image, perform contrast normalization on the merged image, and output a normalized image.

15. The system of claim 14, wherein the processing device is configured to execute a post-processing module to receive as input the normalized image, perform at least one of white balance correction, sharpness correction, and detail correction on the normalized image, and output an enhanced image.

16. A method of image enhancement, comprising:
receiving as input at an interface device one or more input images, the one or more input images having one or more exposure values;
executing an exposure value (EV) resampling module with a processing device to receive as input the one or more input images, and generate one or more resampled images, each of the one or more resampled images having an altered exposure value for the entire resampled image that is different from the one or more exposure values of the one or more input images, and the resampled images having a range of exposure values;
executing a filtering module with the processing device to receive as input the resampled images, filter the resampled images, and output a set of filtered images; and
executing a blending module with the processing device to receive as input the set of filtered images, sequentially blend the set of filtered images, and output a merged image.

17. The method of claim 16, comprising executing a sorting module with the processing device to receive as input the one or more input images and arrange the one or more input images from highest exposure value to lowest exposure value.

18. The method of claim 16, comprising executing a normalization module with the processing device to receive as input the merged image, perform contrast normalization on the merged image, and output a normalized image.

19. The method of claim 18, comprising executing a post-processing module with the processing device to receive as input the normalized image, perform at least one of white balance correction, sharpness correction, and detail correction on the normalized image, and output an enhanced image.

20. A non-transitory computer-readable medium storing instructions at least for enhancing images that are executable by a processing device, wherein execution of the instructions by the processing device causes the processing device to:
  receive as input at an interface device one or more input images, the one or more input images having one or more exposure values;
  execute an exposure value (EV) resampling module to receive as input the one or more input images, and generate one or more resampled images, each of the one or more resampled images having an altered exposure value for the entire resampled image that is different from the one or more exposure values of the one or more input images, and the resampled images having a range of exposure values;
  execute a filtering module to receive as input the resampled images, filter the resampled images, and output a set of filtered images; and
  execute a blending module to receive as input the set of filtered images, sequentially blend the set of filtered images, and output a merged image.

21. A system of image enhancement, comprising:
  an interface device configured to receive as input one or more input images, the one or more input images having one or more exposure values; and
  a processing device in communication with the interface device, the processing device configured to:
  (i) execute an exposure value (EV) resampling module to receive as input the one or more input images, and generate one or more resampled images having exposure values different from the one or more exposure values of the one or more input images, the resampled images having a range of exposure values;
  (ii) execute a filtering module to receive as input the resampled images, filter the resampled images, and output a set of filtered images; and
  (iii) execute a blending module to receive as input the set of filtered images, sequentially blend the set of filtered images, and output a merged image;
  wherein:
    the processing device is configured to execute a sorting module to receive as input the one or more input images and arrange the one or more input images from highest exposure value to lowest exposure value;
    the one or more resampled images generated by the EV resampling module incrementally filling exposure value gaps between the one or more input images to complete the range of exposure values;
    the processing device is configured to execute a luminosity mask module to receive as input the one or more resampled images and generate a monochrome masked set of images corresponding with the one or more resampled images;
    the resampled images comprise equal exposure value increments of 0.5 within the range of exposure values;
    the filtering module generates a monochrome luminance representation of each of the images of the resampled images, and filters the monochrome luminance representation of the resampled images;
    the filtering module applies a modified local Laplacian filter to filter the set of resampled images;
    the blending module defines an image of the set of filtered images having a highest exposure value as a base image for blending, and blends the base image with an adjacent image having an incrementally lower exposure value; or
    the processing device is configured to execute a normalization module to receive as input the merged image, perform contrast normalization on the merged image, and output a normalized image.

22. A method of image enhancement, comprising:
  receiving as input at an interface device one or more input images, the one or more input images having one or more exposure values;
  executing an exposure value (EV) resampling module with a processing device to receive as input the one or more input images, and generate one or more resampled images having exposure values different from the one or more exposure values of the one or more input images, the resampled images having a range of exposure values;
  executing a filtering module with the processing device to receive as input the resampled images, filter the resampled images, and output a set of filtered images; and
  executing a blending module with the processing device to receive as input the set of filtered images, sequentially blend the set of filtered images, and output a merged image;
  wherein:
    the method comprises executing a sorting module with the processing device to receive as input the one or more input images and arrange the one or more input images from highest exposure value to lowest exposure value;
    the one or more resampled images generated by the EV resampling module incrementally fill exposure value gaps between the one or more input images to complete the range of exposure values;
    the method comprises executing a luminosity mask module with the processing device to receive as input the one or more resampled images and generate a monochrome masked set of images corresponding with the one or more resampled images;
    the resampled images comprise equal exposure value increments of 0.5 within the range of exposure values;
    the method comprises executing a filtering module with the processing device to generate a monochrome luminance representation of each of the images of the resampled images, and to generate the monochrome luminance representation of the resampled images;
    the method comprising executing the filtering module with the processing device to apply a modified local Laplacian filter to filter the set of resampled images;

the blending module defines an image of the set of filtered images having a highest exposure value as a base image for blending, and is executed with the processing device to blend the base image with an adjacent image having an incrementally lower exposure value; or the method comprises executing a normalization module with the processing device to receive as input the merged image, perform contrast normalization on the merged image, and output a normalized image.

* * * * *